(12) United States Patent
Wahlberg et al.

(10) Patent No.: US 8,961,061 B2
(45) Date of Patent: Feb. 24, 2015

(54) CABLE CONNECTION SYSTEMS AND METHODS

(75) Inventors: Michael Wahlberg, Beaumont, TX (US); Eric Shane Callarman, Beaumont, TX (US); Jesse Justin Colvin, Katy, TX (US)

(73) Assignee: Gulf Copper, Port Arthur, TX (US)

( * ) Notice: Subject to any disclaimer, the term of this patent is extended or adjusted under 35 U.S.C. 154(b) by 264 days.

(21) Appl. No.: 12/852,462

(22) Filed: Aug. 7, 2010

(65) Prior Publication Data

US 2012/0034025 A1 Feb. 9, 2012

(51) Int. Cl.
*F16G 11/05* (2006.01)
*F16G 11/02* (2006.01)
*F16G 11/08* (2006.01)

(52) U.S. Cl.
CPC .............. *F16G 11/05* (2013.01); *F16G 11/025* (2013.01); *F16G 11/08* (2013.01)
USPC .............. 403/275; 403/278; 403/78; 439/462

(58) Field of Classification Search
CPC ..... F16G 11/025; F16G 11/03; F16G 11/046; F16G 11/048; F16G 11/05; F16G 11/08
USPC ............. 403/72, 78, 275, 276, 282, 300, 269, 403/212, 278, 376; 166/351, 354, 77.2, 166/352, 77.1; 441/24, 25, 26, 27, 23; 439/461, 462, 463
See application file for complete search history.

(56) References Cited

U.S. PATENT DOCUMENTS

| | | | | | |
|---|---|---|---|---|---|
| 427,302 | A | * | 5/1890 | Dumas | 403/275 |
| 1,496,142 | A | * | 6/1924 | Wirkkala | 403/274 |
| 1,577,003 | A | * | 3/1926 | Sunderland | 24/122.3 |
| 1,723,728 | A | * | 8/1929 | Fox | 403/275 |
| 2,016,856 | A | * | 10/1935 | Fiege | 403/185 |
| 2,032,567 | A | * | 3/1936 | Fiege | 24/115 R |
| 2,111,107 | A | * | 3/1938 | Walde | 164/100 |
| 2,412,948 | A | * | 12/1946 | Brickman | 403/376 |
| 2,463,116 | A | * | 3/1949 | Lewis | 403/72 |
| 3,032,846 | A | * | 5/1962 | Stanton et al. | 403/212 |
| 3,254,383 | A | * | 6/1966 | Ehmann | 403/275 |
| 3,346,284 | A | * | 10/1967 | Petersen et al. | 403/78 |
| 3,475,795 | A | * | 11/1969 | Youngblood | 24/122.6 |
| 3,600,765 | A | * | 8/1971 | Rovinsky et al. | 24/122.6 |
| 3,829,937 | A | * | 8/1974 | Metzler | 24/122.6 |
| 3,844,665 | A | * | 10/1974 | Smith et al. | 403/267 |
| 4,000,557 | A | * | 1/1977 | Bawden et al. | 29/525 |
| 4,043,690 | A | * | 8/1977 | Browne | 403/268 |

(Continued)

*Primary Examiner* — Joshua Kennedy
*Assistant Examiner* — Matthew R McMahon
(74) *Attorney, Agent, or Firm* — King & Spalding L.L.P.

(57) ABSTRACT

A system for connecting two wire ropes includes first and second wire rope connectors, a swivel, and first and second connecting cables. The first wire rope connector includes a base defining a chamber for receiving an end of a first wire rope, a plug, and a cap that secures to the base to compress the plug and first wire rope end within the chamber. Similarly, the second wire rope connector includes a base defining a chamber for receiving an end of a second wire rope, a plug, and a cap that secures to the base to compress the plug and second wire rope end within the chamber. The swivel includes a first portion rotationally coupled to a second portion. The first connecting cable is coupled between the first wire rope connector and the first portion of the swivel, and the second connecting cable is coupled between the second wire rope connector and the second portion of the swivel.

17 Claims, 8 Drawing Sheets

(56) References Cited

U.S. PATENT DOCUMENTS

| | | | |
|---|---|---|---|
| 4,123,133 A * | 10/1978 | Pickett et al. | 439/863 |
| 4,464,812 A * | 8/1984 | Crook et al. | 24/122.6 |
| 4,489,828 A * | 12/1984 | Stipdonk | 198/847 |
| 4,507,008 A * | 3/1985 | Adl et al. | 403/275 |
| 5,022,780 A * | 6/1991 | Shaw | 403/275 |
| 5,080,614 A * | 1/1992 | Utgaren | 439/695 |
| 5,136,755 A * | 8/1992 | Shaw | 24/122.6 |
| 5,337,621 A * | 8/1994 | Spease | 74/502.4 |
| 5,351,366 A * | 10/1994 | Shaw | 24/122.6 |
| 5,573,423 A * | 11/1996 | Lin et al. | 439/462 |
| 5,611,636 A * | 3/1997 | Flory | 403/269 |
| 5,683,273 A * | 11/1997 | Garver et al. | 439/784 |
| 5,904,438 A * | 5/1999 | Vaseghi et al. | 403/268 |
| 7,121,872 B1 * | 10/2006 | Hanks | 439/427 |
| 2008/0282511 A1 * | 11/2008 | Chou et al. | 24/135 R |
| 2010/0048051 A1 * | 2/2010 | Melni | 439/271 |
| 2011/0240403 A1 * | 10/2011 | Meillet | 182/3 |

* cited by examiner

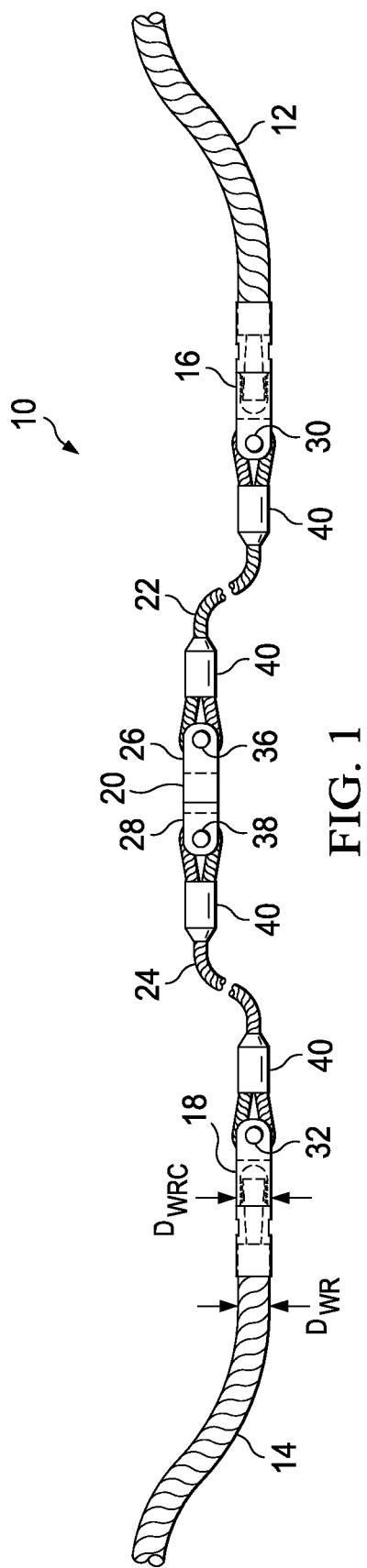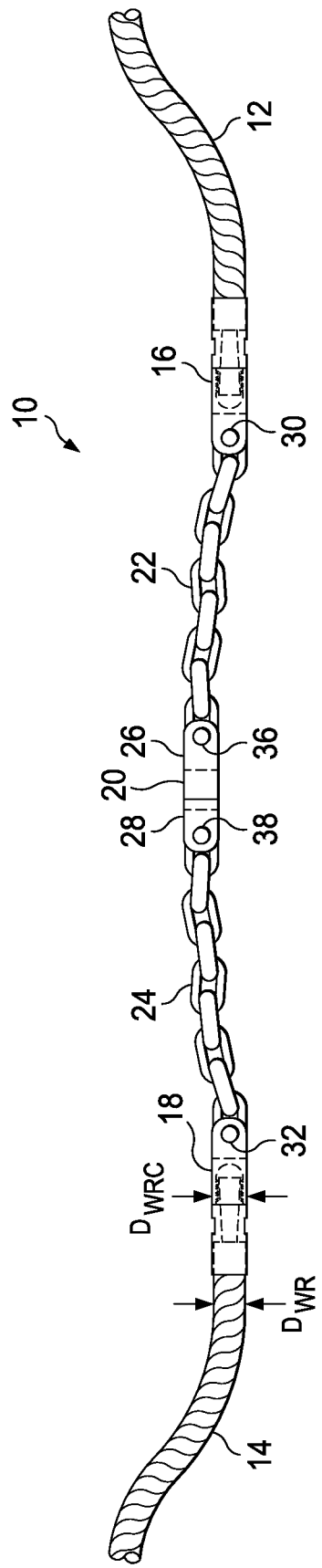

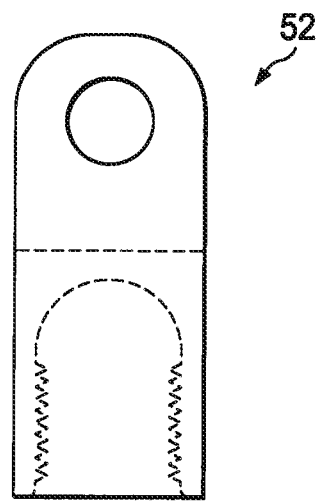
FIG. 10C
FIG. 10D
FIG. 10E

CABLE CONNECTION SYSTEMS AND METHODS

TECHNICAL FIELD

The present disclosure relates generally to the field of wire rope or cable connection systems and methods, e.g., systems and methods for connecting a free end of one wire rope to a free end of another wire rope.

BACKGROUND

It is useful in various applications to splice the ends of two wire rope cables together, e.g., to increase the length of the wire rope cable. For example, in oil and gas service applications, there is often a need to splice together two wire rope cables, e.g., for reeving replacement cable into an existing mechanical system. In some applications, large forces may be applied to the cable splice, thus requiring a strong and durable cable splice.

SUMMARY

In accordance with certain embodiments of the present disclosure, a system for connecting the ends of two wire ropes may include first and second wire rope connectors, a swivel device, and first and second connecting cables. The first wire rope connector includes a connector base defining a chamber for receiving an end portion of a first wire rope, a plug inserted in the chamber, and a connector cap that secures to the connector base to compress the plug and the first wire rope end within the chamber. Similarly, the second wire rope connector includes a connector base defining a chamber for receiving an end portion of a second wire rope, a plug inserted in the chamber, and a connector cap that secures to the connector base to compress the plug and the second wire rope end within the chamber. The swivel device including a first portion rotationally coupled to a second portion. The first connecting cable is coupled between the first wire rope connector and the first portion of the swivel device, and the second connecting cable is coupled between the second wire rope connector and the second portion of the swivel device.

Further, in accordance with certain embodiments of the present disclosure, a system includes a connector base, a connector cap, and a deformable plug. The connector base includes a mating structure, and an opening for receiving an end portion of a wire rope, the opening defining a chamber. The deformable plug is configured for insertion between multiple strands of the wire rope extending through the chamber of the connector base. The connector cap includes a mating structure, a compression portion, and a coupling portion. The mating structure of the connector cap is configured for mating with the mating structure of the connector base to secure the connector cap with the connector base. The compression portion of the connector cap is configured for compressing the multiple wire rope strands and the deformable plug within the chamber of the connector base upon securing of the connector cap with the connector base. The coupling portion of the connector cap is configured for coupling the connector cap to a separate structure. The deformable plug is more ductile than both the connector base and the connector cap such that the compression caused by the compression portion of the connector cap during securing of the connector cap with the connector base deforms the deformable plug, but not the connector base or the connector cap. The deformation of the deformable plug increases a connection strength between the deformable plug and the multiple wire rope strands within the chamber of the connector base.

Further, in accordance with certain embodiments of the present disclosure, a method for connecting two wire ropes together is provided. A first wire rope is connected to a first wire rope connector by a process including: inserting an end portion of the first wire rope into a chamber defined by the first connector base; inserting a plug into the first connector base chamber; and securing a first connector cap to the first connector base to compress the first plug and the end portion of the first wire rope within the first connector base chamber. A second wire rope is connected to a second wire rope connector by a process including: inserting an end portion of the second wire rope into a chamber defined by the second connector base; inserting a plug into the second connector base chamber; and securing a second connector cap to the second connector base to compress the second plug and the end portion of the second wire rope within the second connector base chamber. A swivel device is coupled between the first and second wire rope connectors. A first connecting cable is coupled between the first wire rope connector and the first portion of the swivel device, and a second connecting cable is coupled between the second wire rope connector and the second portion of the swivel device.

BRIEF DESCRIPTION OF THE DRAWINGS

FIG. 1 illustrates an example wire rope connection system, including wire ropes as connection cables, according to certain embodiments of the disclosure.

FIG. 2 illustrates an example wire rope connection system, including chains as connection cables, according to certain embodiments of the disclosure.

FIGS. 3-6 illustrate example components of a wire rope connector, according to certain embodiments of the present disclosure.

In particular, FIG. 3 illustrates an example connector base; FIG. 5 illustrates an example plug; and FIG. 6 illustrates an example coupling pin.

In particular, FIG. 7A illustrates a step of unwinding or unweaving a wire rope and cutting away end portions of the outer major strands; FIG. 7B illustrates a step of inserting the wire rope through an opening in a connector base; FIG. 7C illustrates a step of inserting a plug in a compression chamber defined by the connector base; FIG. 7D illustrates a step of connecting a connector cap to the connector base; FIG. 7E illustrates a step of tightening the connector cap to the connector base; and FIG. 7F illustrates the assembled wire rope connector with the wire rope secured thereto.

FIGS. 10A-10E illustrate example dimensions for the components of an example wire rope connector for use with a 1.5" diameter wire rope, according to one example of the present disclosure.

In particular, FIG. 10A illustrates example dimensions for an example connector base; FIG. 10B illustrates example dimensions for an example connector cap, along a first view; FIG. 10C illustrates example dimensions for the example connector cap, along a second view perpendicular to the view of FIG. 10B; FIG. 10D illustrates example dimensions for an example plug; and FIG. 10E illustrates example dimensions for an example coupling pin.

In particular, FIG. 11 illustrates example strength test data corresponding to a first axial pull rate of the wire rope; FIG. 12 illustrates example strength test data corresponding to a second axial pull rate of the wire rope greater than the first axial pull rate; and FIG. 13 illustrates example strength test data corresponding to a third axial pull rate of the wire rope greater than both the second axial pull rate.

DETAILED DESCRIPTION OF THE DRAWING

Figure 3:
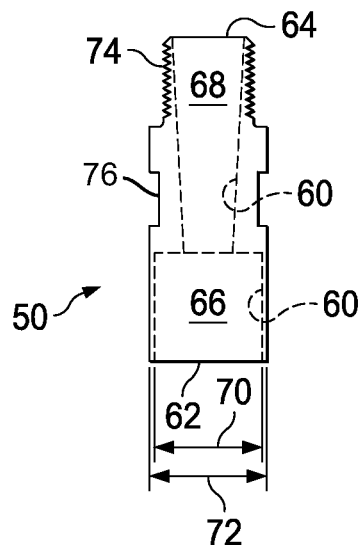

Selected embodiments of the disclosure may be understood by reference, in part, to FIGS. 1-13, wherein like numbers refer to same and like parts. The present disclosure relates to systems and methods for connecting the ends of two wire rope cables to each other, thus forming a wire rope splice, which may be used in a variety of different applications. For example, in oil and gas service applications, the systems and methods for splicing wire rope cables may be used for reeving replacement cable into an existing mechanical system. Further, the systems and methods disclosed herein may provide a strong and durable wire rope cable splices.

FIG. 1 illustrates an example wire rope connection system 10 (i.e., wire rope splice), according to certain embodiments of the disclosure. Wire rope connection system 10 may be generally configured to connect two wire ropes together, e.g., to form a wire rope splice. System 10 may be useful in a variety of different applications, e.g., oil and gas applications (e.g., for reeving a drilling line), respooling of cranes, deck equipment, or wire rope machinery. As used herein, the term "wire rope" refers to any rope or cable formed from multiple strands of wire (formed from steel, wrought iron, other metal(s), or other suitable non-metal(s)) twisted, woven, or otherwise laid together.

As shown in FIG. 1, wire rope connection system 10 may be used to connect a first wire rope 12 to a second wire rope 14. System 10 may include a first wire rope connector 16, a second wire rope connector 18, a swivel device 20, a first connecting cable 22, and a second connecting cable 24. First wire rope connector 16 is configured for securing an end portion of first wire rope 12, and includes a coupling device 30. Similarly, second wire rope connector 18 is configured for securing an end portion of second wire rope 14 and includes a coupling device 32. Details of an example embodiments of wire rope connector 16 and/or 18 are discussed in detail below with reference to FIGS. 3-12. Coupling devices 30 and 32 may include any devices or structures for coupling first and second wire rope connectors 16 and 18 to first and second connecting cables 22 and 24, respectively. For example, coupling devices 30 and 32 may include pins, threaded connectors, latches, hooks, eyes, etc.

Swivel device 20 is connected between first wire rope connector 16 and second wire rope connector 18. Swivel device 20 may include a first portion 26, a second portion 28, and any known or suitable device or structure for pivotally coupling first portion 26 to second portion 28. Swivel device 20 may allow first wire rope 12 to twist or rotate relative to second wire rope 14, e.g., to help prevent the unwinding and/or separation of the wire strands that make up wire rope 12 and/or 14.

First and second portions 26 and 28 of swivel device 20 may include coupling devices 36 and 38, respectively. Coupling devices 36 and 38 may include any devices or structures for coupling first and second portions 26 and 28 of swivel device 20 to first and second connecting cables 22 and 24, respectively. For example, coupling devices 36 and 38 may include pins, threaded connectors, latches, hooks, eyes, etc.

First connecting cable 22 may be directly or indirectly connected between first wire rope connector 16 and swivel device 20, and second connecting cable 24 may be directly or indirectly connected between second wire rope connector 18 and swivel device 20. For example, first connecting cable 22 may be connected at one end to coupling device 30 of first wire rope connector 16 and connected at the opposite end to coupling device 36 of the first portion 26 of swivel device 20; and second connecting cable 24 may be connected at one end to coupling device 32 of second wire rope connector 18 and connected at the opposite end to coupling device 38 of the second portion 30 of swivel device 20.

First and second connecting cables 22 and 24 may comprise any cables, ropes, or other connectors suitable for connecting first and second wire rope connectors 16, 18 with swivel device 20. Further, first and second connecting cables 22 and 24 may include any suitable coupling devices (e.g., swage fittings, pins, threaded connectors, latches, hooks, eyes, etc.) for engaging with coupling devices 30, 32, 36, and 38 in any suitable manner.

For example, in the example embodiment shown in FIG. 1, first and second connecting cables 22 and 24 may comprise lengths of wire rope connected to coupling devices 30, 32, 36, and 38 by swage fittings 40. In this embodiment, coupling devices 30, 32, 36, and 38 may comprise pins or other structures suitable for engaging with swage fittings 40. As another in the example embodiment shown in FIG. 2 (discussed below), first and second connecting cables 22 and 24 may comprise lengths of chain, and coupling devices 30, 32, 36, and 38 may comprise pins or other structures suitable for engaging with the links of the chains.

Connecting cables 22 and 24 may comprise any other suitable cables, chains, ropes, or other connecting elements. In addition, connecting cables 22 and 24 may be the same or different from each other. For example, system 10 may including a chain connecting cable 22 and a wire rope connecting cable 24.

In some embodiments, swivel device 20 may be connected directly to one or both of first wire rope connector 16 and second wire rope connector 18. For instance, in one example embodiment, first portion 26 of swivel device 20 is connected directly to first wire rope connector 16, and second portion 28 of swivel device 20 is connected to second wire rope connector 18 by a connecting cable 24 (i.e., connecting cable 22 is not used). In another example embodiment, first portion 26 of swivel device 20 is connected directly to first wire rope connector 16, and second portion 28 of swivel device 20 is connected directly to second wire rope connector 18 (i.e., connecting cables 22 and 24 are not used).

FIG. 2 illustrates another example wire rope connection system 10 according to certain embodiments of the disclosure. In this embodiment, connection cables 22 and 24 comprise lengths of chains rather than the wire ropes used in the embodiment of FIG. 1. Chains 22 and 24 may be formed from any suitable metal or other material. As discussed above, coupling devices 30, 32, 36, and 38 may comprise pins or other structures suitable for engaging with the links of chains 22 and 24.

In some embodiments, the outer diameter of wire rope connectors 16 and 18 is greater than or equal to the outer diameter of (a) all other components of system 10 (which, depending on the embodiment, may include swivel device 20, connecting cables 22 and/or 24, swage fittings 40, and/or coupling devices 30, 32, 36, 38) and (b) wire ropes 12 and 14.

Further, in certain embodiments, the outer diameter $D_{WRC}$ of wire rope connectors 16 and 18 is not more than 10% larger than (a) the outer diameter $D_{WR}$ of wire ropes 12 and 14 if wire ropes 12 and 14 have the same diameter, or (b) the larger outer diameter $D_{WR}$ of wire ropes 12 and 14 if wire ropes 12 and 14 have different diameters. In particular embodiments, the outer diameter $D_{WRC}$ of wire rope connectors 16 and 18 is not more than 5% larger than (a) the outer diameter $D_{WR}$ of wire ropes 12 and 14 if wire ropes 12 and 14 have the same diameter, or (b) the larger outer diameter $D_{WR}$ of wire ropes 12 and 14 if wire ropes 12 and 14 have different diameters. In such embodiments, this relatively small difference in diameter between wire rope connectors 16 and 18 and wire ropes 12 and 14 may be advantageous for running or pulling wire ropes 12 and 14 and connection system 10 through sized openings, over the edge of a structure, over a pulley wheel, sheave, or drum, or within a channel, such as a groove or channel of a pulley wheel, sheave, or drum designed to receive a wire rope. For example, in some embodiments, the relatively small difference in diameter between wire rope connectors 16 and 18 and wire ropes 12 and 14 may reduce the likelihood of connection system 10 snagging or catching on another structure and/or may allow connection system 10 to fit through a sized opening or within a groove or channel of a pulley wheel, sheave, or drum.

FIGS. 3-6 illustrate example components of wire rope connector 16, according to certain embodiments of the present disclosure. Depending on the particular embodiment, wire rope connector 18 may be identical to or different from wire rope connector 16.

Figure 5:
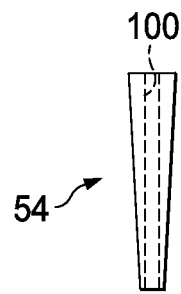
Figure 6:
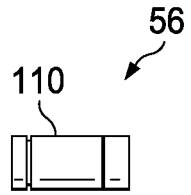

In this example, wire rope connector 16 includes a connector base 50 (FIG. 3), a connector cap 52 (FIGS. 4A and 4B), a plug 54 (FIG. 5), and a coupling pin 56 (FIG. 6). Wire rope connector 16 may or may not include additional components. Coupling pin 56 may act as coupling device 30 or 32 shown in FIGS. 1 and 2). Thus, in embodiments in which coupling devices 30 and 32 comprise devices other than pins, wire rope connector 16 may include such other coupling device(s) instead of a coupling pin 56.

As shown in FIG. 3, connector base 50 may include a longitudinal passage 60 extending from a first end 62 to a second end 64. Passage 60 includes a wire rope receptacle 66 and a compression chamber 68. In the illustrated embodiment, wire rope receptacle 66 is cylindrical. The inner diameter 70 of wire rope receptacle 66 may be sized to receive the full outer diameter of wire rope 12 (e.g., without cutting away any strands). For example, the inner diameter 70 may be sized to form a tight fit (e.g., an interference fit or friction fit) with wire rope 12 received within wire rope receptacle 66. The wall thickness of wire rope receptacle 66 may be relatively thin. For example, in some embodiments, the outer diameter 72 of connector base 50 is not more than 10% greater than the inner diameter 70 of wire rope receptacle 66. In certain embodiments, the outer diameter 72 of connector base 50 is not more than 5% greater than the inner diameter 70 of wire rope receptacle 66. The inner wall of wire rope receptacle 66 may have any suitable surface texture. For example, in some embodiments, the inner wall of wire rope receptacle 66 is smooth to facilitate an interference or friction fit with the outer surface of wire rope 12.

Compression chamber 68 may be configured for receiving an inner portion (e.g., the core) of wire rope 12 (e.g., with outer strands cut away), along with plug 54, such that when connector cap 52 is secured and tightened to connector base 50, a compression/friction fitting is created between the inner portion of wire rope 12, plug 54, and the inner walls of compression chamber 68, which secures wire rope 12 within wire rope connector 16. Thus, because compression chamber 68 may receive only the inner portion of wire rope 12 rather than the full thickness of wire rope 12 received within wire rope receptacle 66, the inner diameter of compression chamber 68—at least at the transition between wire rope receptacle 66 and compression chamber 68—may be smaller than the inner diameter 70 of wire rope receptacle 66.

In the illustrated embodiment, compression chamber 68 has a tapered conical shape. In embodiments in which plug 54 has a tapered shape, the degree of taper of compression chamber 68 may be equal to, greater than, or less than the degree of taper of plug 54, depending on the particular embodiment. In the illustrated embodiment, the degree of taper of compression chamber 68 is equal to the degree of taper of plug 54. In other embodiments, compression chamber 68 may have a non-tapered conical shape or any other suitable shape, which may or may not correspond to the shape of plug 54 used in the respective embodiment.

The inner wall of compression chamber 68 may have any suitable surface texture. For example, in some embodiments, the inner wall of compression chamber 68 may be rough or textured to provide increased friction with strands of wire rope 12 compressed between plug 54 and the inner wall of compression chamber 68. In other embodiments, the inner wall of compression chamber 68 may be smooth.

Connector base 50 may include a mating structure 74 for engaging with a corresponding mating structure 80 of connector cap 52, in order to secure connector cap 52 to connector base 50, which creates the compression/friction fitting within compression chamber 68, which secures wire rope 12 to wire rope connector 16, as discussed above. In the illustrated embodiment, mating structures 74 and 80 comprise threads which allow a threaded connection and tightening of connector cap 52 to connector base 50. In other embodiments, mating structures 74 and 80 may comprise any other suitable structures for securing connector cap 52 to connector base 50.

Connector base 50 may also include wrench flats 76 to provide a flat surface for gripping connector base 50 with a wrench, vice, or other tool, e.g., for connecting connector base 50 to connector cap 52.

Figure 4A:
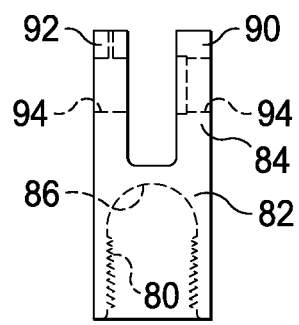
FIG. 4A illustrates a cross-sectional side view of an example connector cap.
Figure 4B:
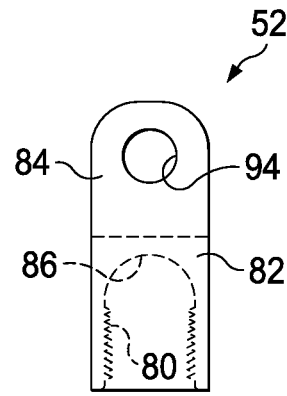
FIG. 4B illustrates another cross-sectional side view of the example connector cap taken perpendicular to the view of FIG. 4A.

FIG. 4A illustrates a side view of connector cap 52, while FIG. 4B illustrates another side view of connector cap 52 rotated 90 degrees. As shown in FIGS. 4A and 4B, connector cap 52 may include a mating structure 80, a compression portion 82, and a coupling portion 84. As discussed above, mating structure 80 is configured for connection with mating structure 74 of connector base 50. In the illustrated embodiment, mating structure 80 comprises a threaded portion, but in other embodiments may comprise any other suitable structure for securing connector cap 52 to connector base 50.

Compression portion 82 may comprise any device or structure for creating the compression/friction fitting within compression chamber 68 of connector base 50 upon the connection of connector cap 52 to connector base 50. In the illustrated embodiment, mating structure 80 comprises a concave compression surface 86 formed within a recess formed in one end of connector cap 52, the same recess in which mating structure 80 is formed. In other embodiments, compression surface 86 may have any other suitable shape, e.g., squared, convex, etc.

Coupling portion 84 may correspond to coupling device 30 shown in FIGS. 1 and 2. In particular, in this embodiment, coupling portion 84 includes a pair of spaced-apart flanges 90 and 92, and a hole 94 extending through flanges 90 and 92 for receiving coupling pin 56. The portion of hole 94 through flange 90 and/or the portion of hole 94 through flange 92 may include internal threads configured to engage with one or more external threaded sections 110 of coupling pin 56. In some embodiments, a coupling portion of connecting cable 22 (e.g., a swage fitting or chain link) may fit between flanges 90 and 92 and engage with pin 56.

FIG. 5 illustrates an example plug 54, according to certain embodiments of the present disclosure. In the illustrated embodiment, plug 54 is has a tapered conical shape. As discussed above, the degree of taper of plug 54 may be equal to, greater than, or less than the degree of taper of compression chamber 68, depending on the particular embodiment. In other embodiments, plug 54 may have any other suitable tapered shape (e.g., a tapered pyramid shape or a tapered prism, etc.) or non-tapered shape (e.g., a cylinder or a non-tapered prism (triangular, rectangular, pentagonal, hexagonal, etc.)).

In the illustrated embodiment, plug 54 includes a cylindrical longitudinal passage 100 extending completely through plug 54. In other embodiments, longitudinal passage 100 may have any other suitable shape and may extend only partially through the length of plug 54. Passage 100 may be configured to receive a portion of wire rope 12, e.g., a strand or subportion of the inner portion (e.g., core) of wire rope 12 extending through compression chamber 68 of connecting base 50, e.g., as discussed below with respect to FIG. 7C. Thus, passage 100 may be shaped and/or sized accordingly relative to the portion of wire rope 12 to be received through passage 100. In other embodiments, passage 100 may not be configured to receive any portion of wire rope 12. In some embodiments, plug 54 may include multiple passages 100. In other embodiments, plug 54 does not include any passages 100. Thus, plug 54 may be solid.

In some embodiments, plug 54 is deformable. In such embodiments, plug 54 is designed to deform due to compressive forces introduced in the compression chamber 68 of connector base 50 upon the connection of connector cap 52 to connector base 50. In particular, as discussed below with respect to the example method of FIGS. 7A-7F, plug 54 may be inserted between strands of wire rope 12 extending fully or partially through compression chamber 68, and connector cap 52 may be threaded onto connector base 50 and torqued down to compress the wire strands and plug 54 within compression chamber 68, causing plug 54 to deform under the compressive forces. The deformation of plug 54 may increase a connection strength between plug 54 and the strands of wire rope 12 within the compression chamber 68 of connector base 50, which may increase the strength of the connection between wire rope 12 and wire rope connector 16.

For example, in some embodiments, strands of wire rope 12 located within compression chamber 68 around the outside of plug 54 may mold into the outer surface of plug 54, i.e., the strands may embed or "dig into" the outside of plug 54. This may cause a friction and/or interference fit between the strands of wire rope 12 and plug 54, thus effectively forming a friction and/or interference fit between wire rope 12 and wire rope connector 16. This friction/interference fit may counteract pulling forces applied to wire rope 12 during the applied use of the spliced wire ropes 12/14.

In embodiments in which plug 54 is deformable, plug 54 may be formed from a more ductile material(s) than both connector base 50 and connector cap 52. For example, connector base 50 and connector cap 52 may be formed from steel, while plug 54 may be formed from a copper alloy (e.g., bronze or brass), nickel, silver, aluminum, titanium, or any other suitable metal, metal alloy, or non-metal that is more ductile than steel. In a particular embodiment, connector base 50 and connector cap 52 may be formed from stainless steel, while plug 54 may be formed from aluminum bronze. In embodiments in which plug 54 is deformable, the compressive forces introduced by the connection of connector cap 52 to connector base 50 may deform plug 54 but not connector base 50 or connector cap 52.

In other embodiments, plug 54 is not configured for deformation. For example, plug 54 may be formed from the same or similar materials as connector base 50 and connector cap 52 (e.g., steel), or from another material having a similar or lower ductility than that of connector base 50 and connector cap 52.

FIG. 6 illustrates an example coupling pin 56, according to certain embodiments of the present disclosure. As discussed above, coupling pin 56 may include one or more external threaded sections 110 of coupling pin 56 for engaging with one or more internal threaded sections of hole 94 within flange 90 and/or flange 92.

FIGS. 7A-7F illustrate an example method for securing wire rope 12 to wire rope connector 16, according to certain embodiments of the present disclosure. In particular, FIG. 7A indicates a profile view of wire rope 12, and FIGS. 7B-7F illustrate cross-sectional side views of wire rope 12 and various components of wire rope connector 16. In a system including a second wire rope 14 and a second wire rope connector 18 (e.g., as shown in FIGS. 1 and 2), the same or similar process may be used to secure the second wire rope 14 to the second wire rope connector 18.

Figure 7A:
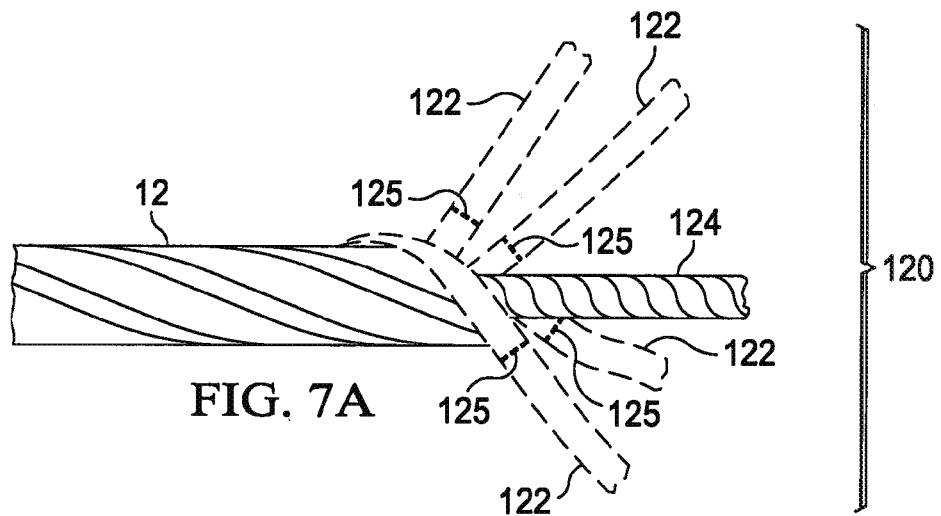
FIGS. 7A-7F illustrate an example method for securing a wire rope to a wire rope connector, according to certain embodiments of the present disclosure.

As shown in FIG. 7A, an end portion of wire rope 12 is unwound or unwoven to separate the rope into a plurality of major strands 120, including multiple outer major strands 122 and an inner major strand, or core, 124. Each major strand 120 may include multiple minor strands, which may or may not be wound, interwoven, or otherwise held together. The core 124 may be similar to or different from the individual outer major strands 122 in overall diameter, number of minor strands, diameter of minor strands, and/or other characteristics.

After separating wire rope 12 into the plurality of major strands 120, the end portions of multiple outer major strands 122 may be cut away at some distance from the end of wire rope 12, as indicated by cut lines 125, thus leaving only the core 124. The cut-away end portions of the major strands 120 are indicated with dashed lines. The separation of the major strands 120, and cutting away of the outer major strands 122, may be performed using any suitable known techniques.

Figure 7B:
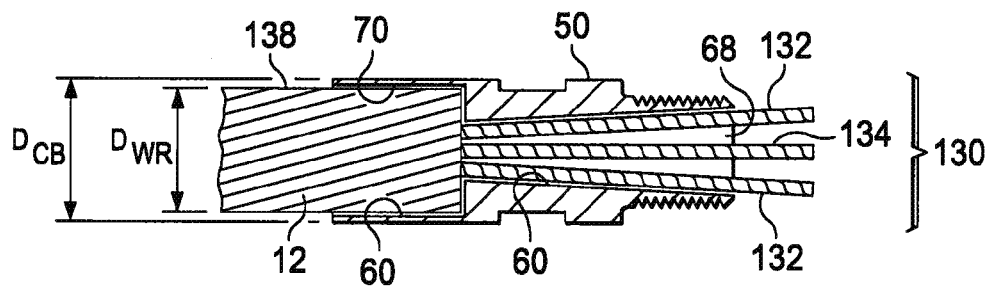

As shown in FIG. 7B, after cutting away the outer major strands 122, wire rope 12 may be inserted through opening 60 in connector base 50, such that the full thickness of wire rope 12 is received in wire rope receptacle 66, and core 124 projecting from the end of wire rope 12 further projects into and/or through compression chamber 68. In some embodiments, the inner diameter 70 may be sized to form a tight fit (e.g., an interference fit or friction fit) with an outer diameter 138 of wire rope 12 received within wire rope receptacle 66. Further, the wall thickness of wire rope receptacle 66 may be relatively thin. As a result, in some embodiments, the outer diameter $D_{CB}$ of connector base 50 is not more than 10% greater than the outer diameter $D_{WR}$ of wire rope 12. In certain embodiments, the outer diameter $D_{CB}$ of connector base 50 is not more than 5% greater than the outer diameter $D_{WR}$ of wire rope 12.

Core 124 may be unwound or unwoven to separate the core 124 into a plurality of core strands 130, including multiple outer core strands 132 and a central core strand 134, as shown in FIG. 7B. Core 124 may be unwound or unwoven before or after inserting wire rope 12 through opening 60, depending on the particular embodiment. Each core strand 130 may include a single wire strand, or multiple wire strands, which may or may not be wound, interwoven, or otherwise held together. The central core strand 134 may be similar to or different from the individual outer core strands 122 in overall diameter, number of wire strands, diameter of wire strands, and/or other characteristics. In some embodiments, core strands 130 extend completely through compression chamber 68 and beyond the end of connecting base 50 by a pre-determined distance for providing the desired compressive forces within compression chamber 68 upon securing of connector cap 52 to connector base 50. In other embodiments, core strands 130 extend only partially through compression chamber 68. In either case, the distance to which the major strands 122 are cut back during the step of FIG. 7A may be pre-determined to provide the desired distance of extension of core 124 through compression chamber 68. Alternatively, where it is desired to have core strands 130 extend completely through compression chamber 68 and beyond the end of connecting base 50, the major strands 122 may be cut back further than needed at FIG. 7A, and then core strands 130 (before or after being separated) may be cut back to the desired distance after being inserted through compression chamber 68.

Figure 7C:
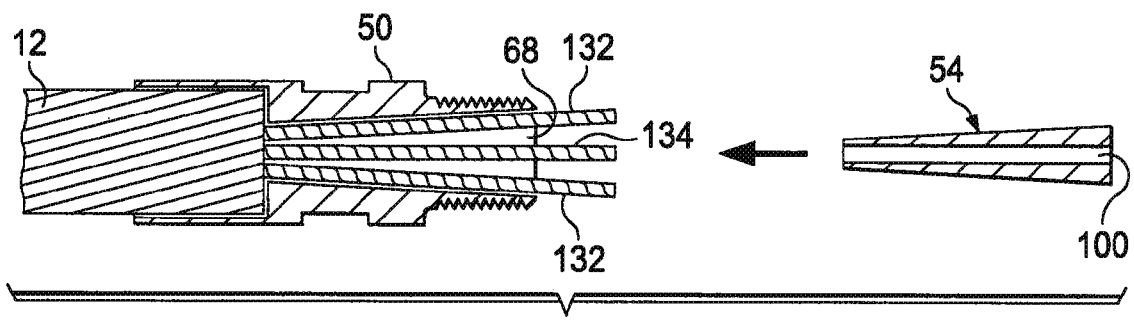

As shown in FIG. 7C, after separating the core strands 130, plug 54 may be inserted into compression chamber 68 such that outer core strands 132 are positioned between the outside of plug 54 and the inner wall of chamber 68 and central core strand 134 is passed through longitudinal passage 100 in plug 54. In some embodiments, plug 54 may be inserted by hand. In other embodiments, plug 54 may be first inserted by hand and then pressed or hammered further down using a tool having an opening for receiving the central core strand 134 extending beyond the trailing end of plug 54, such that the tool can act directly on plug 54.

In other embodiments, central core strand 134 may not be passed through longitudinal passage 100, but rather positioned between the outside of plug 54 and the inner wall of chamber 68, similar to the outer core strands 132. In other embodiments, plug 54 includes more than one longitudinal passage for receiving multiple core strands 130 (which may or may not include the central core strand 134). In still other embodiments, plug 54 does not include any passages for receiving any core strands 130.

Figure 7D:
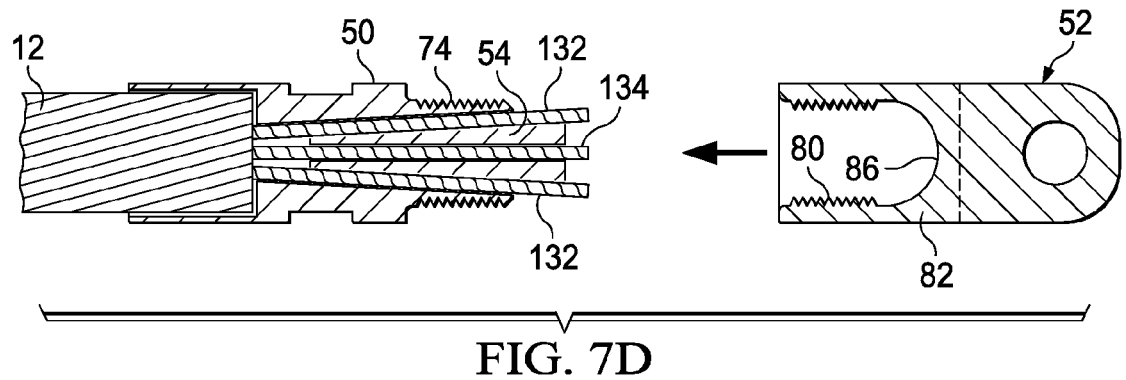
Figure 7E:
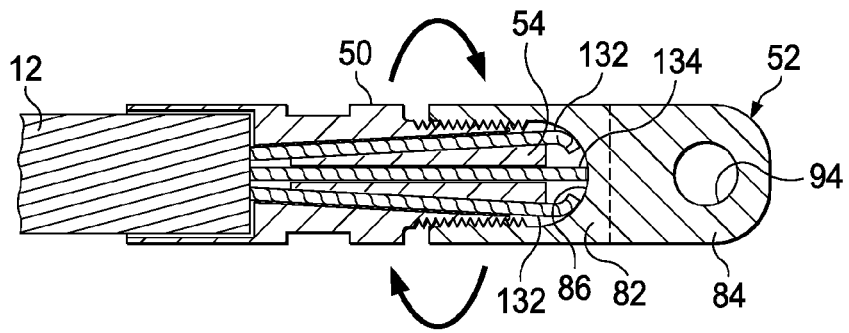
Figure 7F:
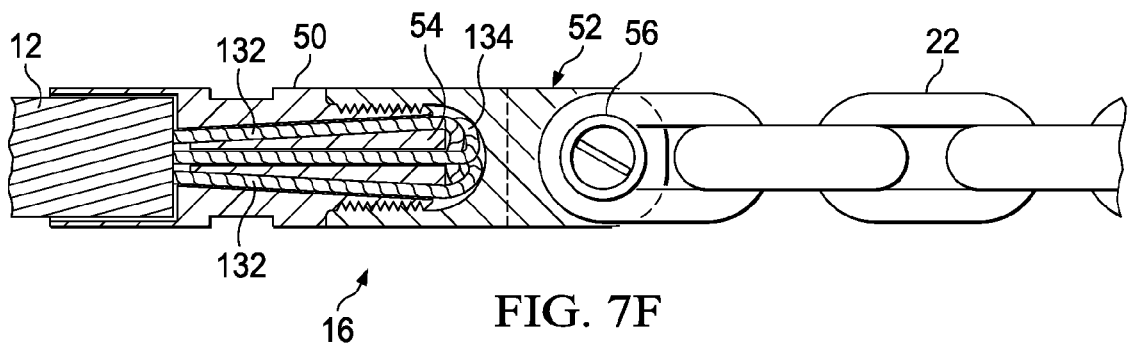

After inserting plug 54 among the various core strands 130, connector cap 52 may be connected to connector base 50, as shown in FIGS. 7D-7F. In some embodiments in which the ends of core strands 130 extend beyond the trailing end of plug 54, the extending core strands 130 may be bound and cinched together (e.g., using a hose clamp or similar device) in order to allow the ends of the core strands 130 to fit within the recess of connector cap 52.

Threaded portion 80 of connector cap 52 may then be screwed to threaded portion 74 of connector base 50, as indicated in FIG. 7E. As connector cap 52 is tightened, the ends of core strands 130 extending beyond the trailing end of plug 54 may be deformed by the concave compression surface 86 of connector cap 52, as shown in FIG. 7E. As connector cap 52 is further tightened, compression surface 86 may begin to apply compressive pressure to plug 54 through the deformed ends of core strands 130 between compression surface 86 and the trailing end of plug 54. The compressive pressure on plug 54 may (a) force plug 54 further into compression chamber 68 (i.e., to the left in FIG. 7E), and (b) cause plug 54 to deform (in embodiments in which plug 54 is deformable). For example, in some embodiments, compressive pressure in chamber 68 may force outer core strands 132 around the outside of plug 54 to mold, embed, or "dig" into the outer surface of plug 54. This may cause a friction and/or interference fit between the strands of wire rope 12 and plug 54, thus effectively forming a friction and/or interference fit between wire rope 12 and wire rope connector 16. This friction/interference fit may counteract pulling forces applied to wire rope 12 during the applied use of the spliced wire ropes 12/14.

Connector cap 52 may be tightened to connector base 50 in any suitable manner, e.g., using a torque wrench or other leveraging tool secured through hole 94 or otherwise secured to connector cap 52, while connector base 50 is held securely, e.g., using a vice. Alternatively, connector base 50 may be rotated and torqued in any suitable manner, while connector cap 52 is held securely, e.g., using a vice.

FIG. 7F illustrates the fully assembled wire rope connector 16, with connector cap 52 fully connected (e.g., torqued) onto connector base 50. Further, connecting cable 22 (shown in this embodiment as a chain) is coupled to connector cap 52 by inserting an end link of chain 22 between flanges 90 and 92 of connector cap 52 (see FIG. 4A) and then securing coupling pin 56 within hole 94 (e.g., by threaded connection) and through the end chain link, as shown.

In this manner, the method illustrated in FIGS. 7A-7F may be used for securing wire rope 12 to wire rope connector 16. This method may then be repeated for securing wire rope 14 to wire rope connector 18, in order to assemble the wire rope connection system 10 (i.e., wire rope splice) shown in FIG. 1 or 2.

Figure 8:
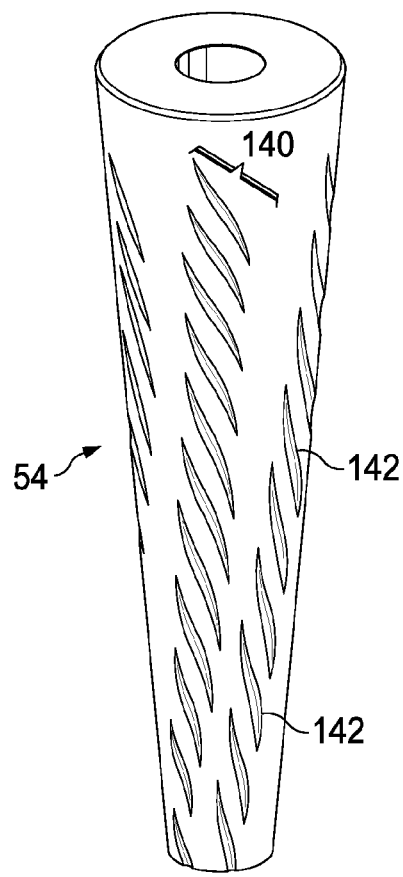
FIG. 8 illustrates an example deformable plug after being deformed during the assembly of a wire rope connector, according to certain embodiments of the present disclosure.

FIG. 8 illustrates an example deformable plug 54 after being deformed during the assembly of a wire rope connector, e.g., wire rope connector 16, according to certain embodiments of the present disclosure. As discussed above, in some embodiments, compressive pressure in chamber 68 caused by the connection and tightening of connector cap 52 to connector base 50 may force outer core strands 132 around the outside of plug 54 to mold, embed, or "dig" into the outer surface of plug 54. FIG. 8 illustrates multiple rows 140 of indentations 142 formed in the outer surface of plug 54 by outer core strands 132. In this example, each outer core strand 132 includes multiple individual wire strands twisted together in a helical manner. Each row 140 of indentations 142 in plug 54 corresponds to one outer core strand 132, and each indentation 142 corresponds with one of the individual wire strands. Because the individual wire strands are twisted together in a helical manner, each individual wire strand contacts the outer surface of plug 54 diagonally relative to the longitudinal direction of the plug 54. In addition, as shown in FIG. 8, in some embodiments, each row 140 may curve at least partially around the circumference of plug 54 (e.g., in a helical manner) caused by rotation of the ends of outer core strands 132 relative to plug 54 during the rotational tightening of connector cap 52 to connector base 50.

Outer core strands 132 becoming molded into indentations 142 in plug 54 may cause a friction and/or interference fit between outer core strands 132 and plug 54, thus effectively forming a strong friction and/or interference fit between the wire rope 12 and wire rope connector 16, which may counteract pulling forces applied to wire rope 12 during the applied use of the spliced wire ropes 12/14. In addition, the diagonal orientation of individual indentations 142 and/or the curved or helical orientation of each row 140 of indentations 142 may provide further physical resistance against pulling forces applied to wire rope 12.

Figure 9:
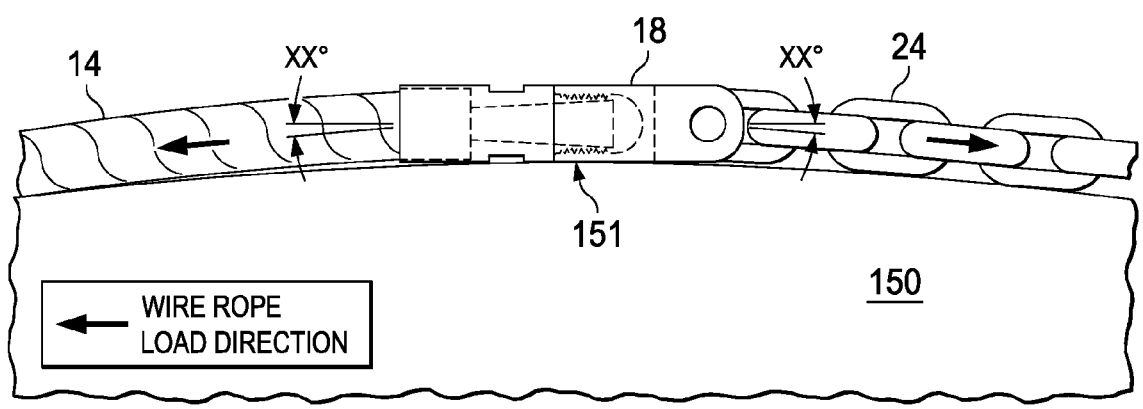
FIG. 9 illustrates the wire rope connector of an assembled wire rope connection system being pulled over a pulley wheel or sheave, according to certain embodiments of the present disclosure.
Figure 10A:
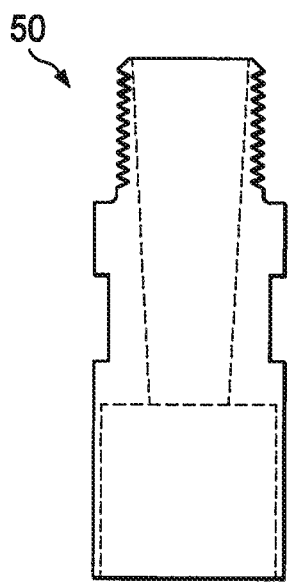
Figure 10B:
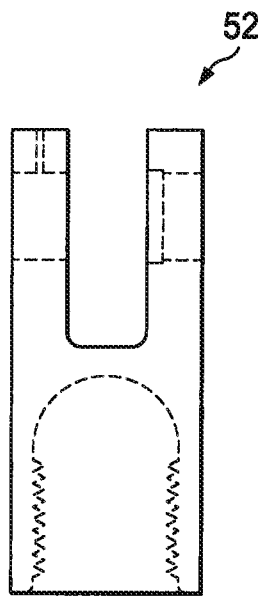

FIG. 9 illustrates a portion of an assembled wire rope connection system 10 being pulled over a pulley wheel or sheave 150 (the top of sheave 150 is indicated at 151), according to certain embodiments of the present disclosure. As shown, the outer diameter of wire rope connector 18 is only slightly larger than the outer diameter of wire rope 14. As discussed above, this relatively small difference in diameter may be reduce the likelihood of connection system 10 snagging or catching on another structure during the sheaving process. In addition, the relatively small diameter wire rope connector 18 (compared to wire rope 14) may allow connection system 10 to fit through within a groove or channel of the sheave 150. In addition, the small difference in diameter between wire rope connector 18 and wire rope 14 results in a relatively small angle of offset between the orientation of wire rope connector 18 and the direction of pull of wire rope 14, indicated as angle X in FIG. 9. This may reduce bending forces or torque placed on the end portion of wire rope 14 adjacent or within connector 18.

FIGS. 10A-10E illustrate example dimensions for the components of an example wire rope connector for use with a 1.5" diameter wire rope, according to one example of the present disclosure. In this example, connector base 50 and connector cap 52 may be formed from 17-4 PH stainless steel machined in the annealed condition and heat treated to condition H900 (minimum yield strength 200,000 psi), while plug 54 may be formed from Aluminum Bronze (minimum yield strength 40,000 psi). It should be understood that the illustrated dimensions and material discussed above correspond only to one example embodiment for use with one particular diameter of wire rope (1.5"). Other embodiments for use with a 1.5" diameter wire rope may have any other suitable dimensions and be formed from any other suitable materials. In addition, embodiments for use with other wire rope diameters have different dimensions, as appropriate.

Figure 11:
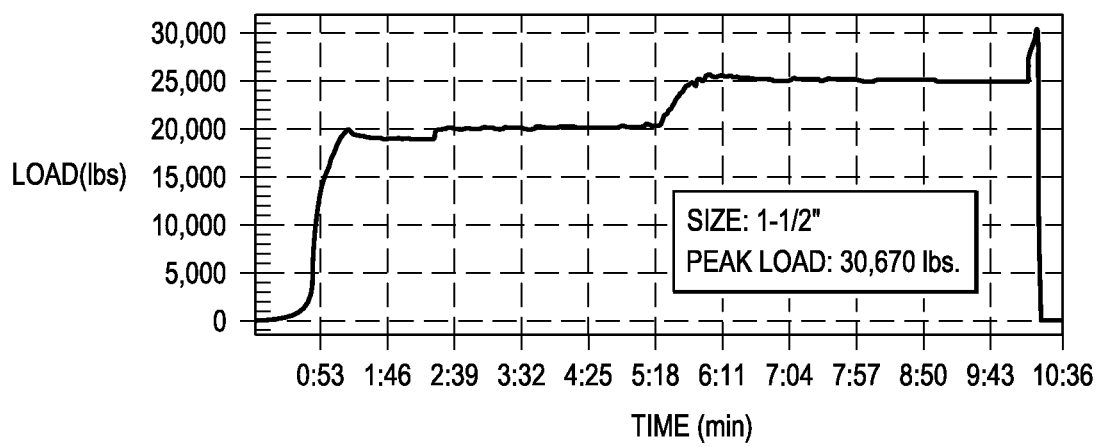
FIGS. 11-13 illustrate example strength test data for one example embodiment of a 1.5" diameter wire rope secured to an example wire rope connector constructed according to the details shown in FIGS. 10A-10E, according to one example of the present disclosure.
Figure 12:
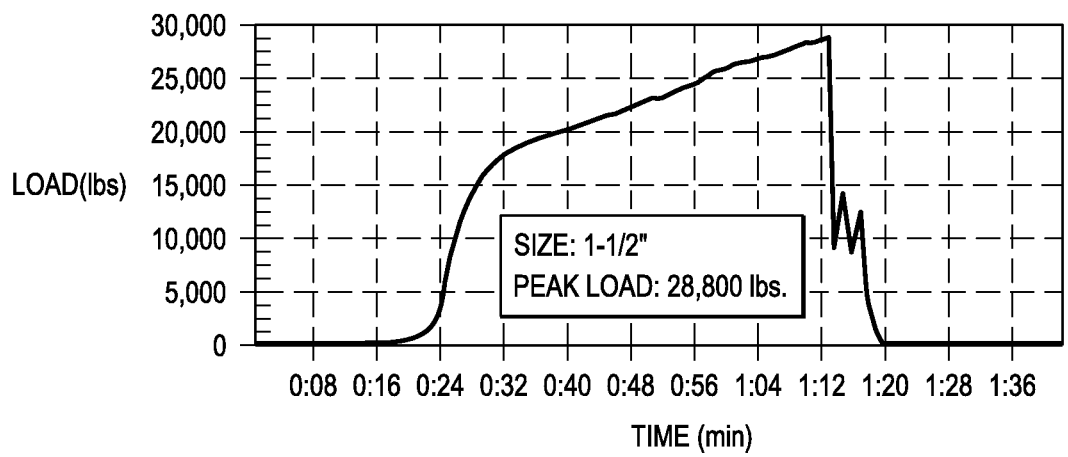
Figure 13:
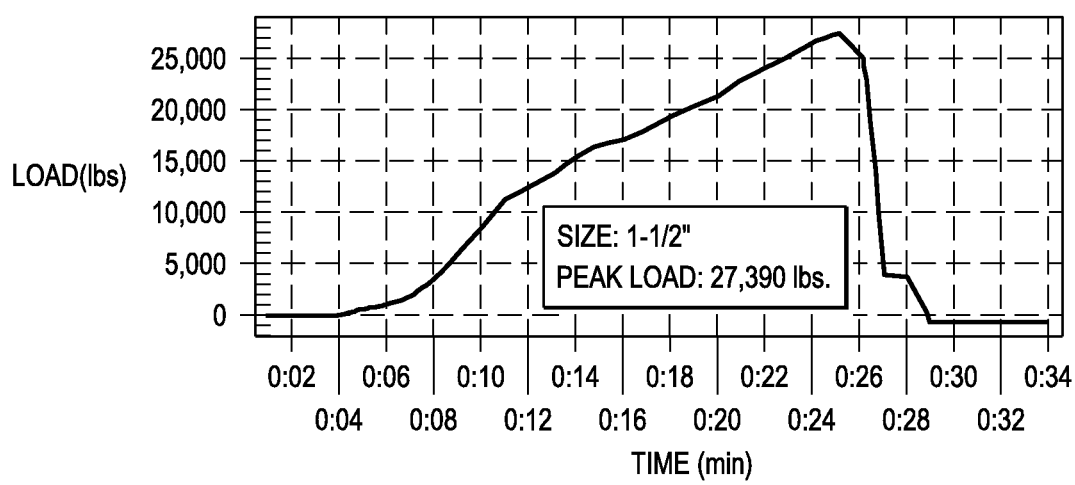

FIGS. 11-13 illustrate example strength test data for one example embodiment of a 1.5" diameter wire rope secured to an example wire rope connector constructed according to the details shown in FIGS. 10A-10E, according to one example of the present disclosure. FIGS. 11-13 illustrate the results of three different tests in which the wire rope connector was held securely and the wire rope was pulled axially. The wire rope was pulled at different rates in the three different tests. In each instance, the mode of failure was a breaking of the wire rope core 124 at a location outside of compression chamber 68 in the direction of the pulling on the wire rope. Thus, the wire rope core 124 did not slide out of compression chamber 68 (and thus out of the wire rope connector) in any of these tests. As shown in the figures, the wire ropes failed at peak loads of 30,670 lbs, 28,800 lbs, and 27,390 lbs in the three tests, respectively.

Example test data for example wire rope connectors for use with 1-½" diameter wire rope, 1⅝" diameter wire rope, and 1¾" diameter wire rope are shown in the table below:

| Test | Wire rope diameter | Peak load before failure |
|---|---|---|
| 1 | 1½" | 30,670 lbs |
| 2 | 1½" | 28,800 lbs |
| 3 | 1½" | 27,390 lbs |
| 4 | 1⅝" | 20,470 lbs |
| 5 | 1¾" | 34,010 lbs |
| 6 | 1¾" | 35,430 lbs |

It will be appreciated that the connection systems and methods discussed above may be useful in a variety of applications, e.g., oil and gas applications (e.g., for reeving a drilling line), respooling of cranes, deck equipment, or wire rope machinery, or any other suitable application. Additionally, it should be understood that various changes, substitutions and alterations can be made herein without departing from the spirit and scope of the disclosure as illustrated by the following claims.

What is claimed:

1. A wire connector comprising:
 a connector base comprising:
  a mating structure; and
  a rigid body defining an internal passage for receiving an end portion of a wire rope to be secured therein; the internal passage including:
   a cylindrical wire rope receptacle extending from a first end to a second end and having an inner diameter; and
   a tapered compression chamber extending from (a) a first end extending from the second end of the cylindrical wire rope receptacle and having a smaller inner diameter than the inner diameter of the cylindrical wire rope receptacle to (b) a second end having a larger inner diameter than the first end of the compression chamber;
  wherein the internal passage is configured to receive the end portion of the wire rope through the cylindrical wire rope receptacle and into the compression chamber;
 a deformable plug configured for insertion in the tapered compression chamber;
 a connector cap comprising:
  a mating structure configured for mating with the mating structure of the connector base to secure the connector cap with the connector base;
  a compression portion configured for compressing strands of the wire rope and the deformable plug within the compression chamber of the connector base upon securing of the connector cap with the connector base;
 wherein the connector cap and the connector base define cylindrical outer surfaces having the same common diameter, and wherein the cylindrical outer surface of the connector cap and the connector base provide a flush cylindrical transition region when the connector cap is secured to the connector base;
 wherein, in a fully assembled state of the wire connector, the connector cap extends over a portion of the tapered compression chamber but not over the cylindrical wire rope receptacle of the connector base; and
 wherein the common diameter of the cylindrical outer surfaces of the connector cap and connector base is not more than 10% larger than the inner diameter of the cylindrical wire rope receptacle of the connector base.

2. A system, comprising:
 a first wire rope connector including a rigid first connector base defining a first passage including a cylindrical wire rope receptacle and a tapered compression chamber for receiving an end portion of a first wire rope, a first plug configured for insertion in the compression chamber of the first connector base and a first connector cap configured for securing to the first connector base to compress the first plug and the end portion of the first wire rope within the compression chamber of the first connector base;

a second wire rope connector including a rigid second connector base defining a second passage including a cylindrical wire rope receptacle and a tapered compression chamber for receiving an end portion of a second wire rope, a second plug configured for insertion in the compression chamber of the second connector base, and a second connector cap configured for securing to the second connector base to compress the second plug and the end portion of the second wire rope within the compression chamber of the second connector base;

wherein the first connector base and the first connector cap define cylindrical outer surfaces having the same diameter, which diameter is not more than 10% larger than an inner diameter of the cylindrical wire rope receptacle of the first connector base, and wherein the second connector base and the second connector cap define cylindrical outer surfaces having the same diameter, which diameter is not more than 10% larger than an inner diameter of the cylindrical wire rope receptacle of the second connector base, a swivel device including a first portion rotationally coupled to a second portion;

a first connecting cable coupled between the first wire rope connector and the first portion of the swivel device; and a second connecting cable coupled between the second wire rope connector and the second portion of the swivel device;

wherein for each of the first and second passages of the respective first and second connector bases:
the cylindrical wire rope receptacle extends from a first end to a second end; and
the tapered compression chamber extends from (a) a first end extending from the second end of the cylindrical wire rope receptacle and having a smaller inner diameter than the inner diameter of the cylindrical wire rope receptacle to (b) a second end having a larger inner diameter than the first end of the compression chamber; and wherein, in a fully assembled state of the system, the first connector cap extends over a portion of the tapered compression chamber but not over the cylindrical wire rope receptacle of the first connector base, and the second connector cap extends over a portion of the tapered compression chamber but not over the cylindrical wire rope receptacle of the second connector base.

3. A system according to claim 2, wherein the first connecting cable is coupled to the first wire rope connector by a first swage fitting, and coupled to the first portion of the swivel device by a second swage fitting.

4. A system according to claim 2, wherein the first and second connecting cables comprise either chains or wire rope.

5. A system according to claim 2, wherein the first plug is deformable such that the first plug is deformed due to compressive forces in the compression chamber of the first connector base caused by securing the connector cap with the connector base, wherein the deformation of the first plug increases a connection strength between the plug and the end of the first wire rope within the compression chamber of the first connector base.

6. A system according to claim 3, wherein the first plug is more ductile than both the first connector base and the first connector cap.

7. A system according to claim 2, wherein for the first connector base, the first end of the compression chamber that extends from the cylindrical wire rope receptacle is sized to receive a radially inner portion of the first wire rope but not a radially outer portion of the first wire rope, the radially inner portion of the first wire rope including multiple wire rope strands extending into the compression chamber of the first connector base, the radially outer portion of the wire rope including additional wire rope strands that are cut back and received in the cylindrical wire rope receptacle to allow insertion of the inner portion of the first wire rope into the compression chamber of the first connector base; and
an outer diameter of the first connector base is not more than 10% larger than an outer diameter of the radially outer portion of the first wire rope received in the cylindrical wire rope receptacle.

8. A system according to claim 2, wherein the deformable plug is configured such that during threaded securing of the connector cap with the connector base, twisted elements of the multiple wire rope strands form indentations in the deformable plug, the indentations extending generally diagonally with respect to a longitudinal direction of the plug.

9. A system according to claim 2, wherein the inner diameter of the second end of the compression chamber is smaller than the inner diameter of the cylindrical wire rope receptacle.

10. A system, comprising:
a connector base including:
a mating structure; and
a passage for receiving an end portion of a wire rope, the passage including:
a cylindrical wire rope receptacle extending from a first end to a second end and having an inner diameter sized to form a tight fit with the outer diameter of the wire rope received therein; and
a single tapered compression chamber extending from (a) a first end extending from the second end of the cylindrical wire rope receptacle and having a smaller inner diameter than the inner diameter of the cylindrical wire rope receptacle to (b) a second end having a larger inner diameter than the first end of the compression chamber but smaller than the inner diameter of the cylindrical wire rope receptacle;
a deformable plug configured for insertion between multiple strands of the wire rope extending at least partially through the passage of the connector base; and
a connector cap including:
a mating structure;
a compression portion; and
a coupling portion;
wherein the mating structure of the connector cap is configured for mating with the mating structure of the connector base to secure the connector cap with the connector base;
wherein the compression portion of the connector cap is configured for compressing the multiple wire rope strands and the deformable plug within the compression chamber of the connector base upon securing of the connector cap with the connector base;
wherein upon fully securing the connector cap with the connector base:
the deformable plug extends only partially through an axial length of the compression chamber due to the cylindrical shape of the second end of the wire rope receptacle from which the compression chamber extends; and the connector cap extends over a portion of the tapered compression chamber but not over the cylindrical wire rope receptacle of the first connector base;

wherein the coupling portion of the connector cap is configured for coupling the connector cap to a separate structure;

wherein the deformable plug is more ductile than both the connector base and the connector cap such that the compression caused by the compression portion of the connector cap during securing of the connector cap with the connector base causes deformation of the deformable plug, but not the connector base or the connector cap; and wherein the deformation of the deformable plug increases a connection strength between the deformable plug and the multiple wire rope strands within the compression chamber of the connector base.

11. A system according to claim 10, wherein the deformable plug includes a longitudinal passage for receiving a central strand of the wire rope during insertion of the deformable plug between the multiple strands of the wire rope.

12. A system according to claim 10, wherein the connector base and the connector cap are formed from steel, and the deformable plug is formed from bronze.

13. A system according to claim 10, wherein each of the deformable plug and the connector base compression chamber have a tapered conical shape.

14. A system according to claim 13, wherein the deformable plug and the connector base compression chamber have the same angle of taper.

15. A system according to claim 10, wherein:

the first end of the compression chamber that extends from the cylindrical wire rope receptacle is sized to receive a radially inner portion of the wire rope but not a radially outer portion of the wire rope, the radially inner portion of the wire rope including the multiple wire rope strands extending through the passage and into the compression chamber, the radially outer portion of the wire rope including additional wire rope strands that are cut back and received in the cylindrical wire rope receptacle to allow insertion of the inner portion of the wire rope into the compression chamber; and an outer diameter of the connector base is not more than 10% larger than an outer diameter of the radially outer portion of the wire rope received in the cylindrical wire rope receptacle.

16. A system according to claim 10, wherein securing the connector cap with the connector base causes at least one of the multiple wire rope strands to physically embed within the deformable plug.

17. A system according to claim 10, wherein the inner diameter of the second end of the compression chamber is smaller than the inner diameter of the cylindrical wire rope receptacle.

* * * * *